Jan. 10, 1967  G. E. RALEY  3,296,662
ANNULAR DIE
Filed Jan. 27, 1965  2 Sheets-Sheet 1
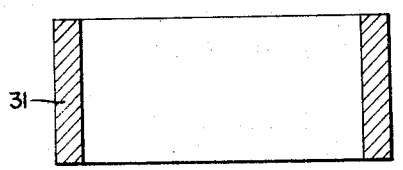
FIG. 3
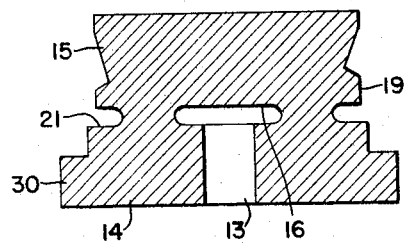
FIG. 2
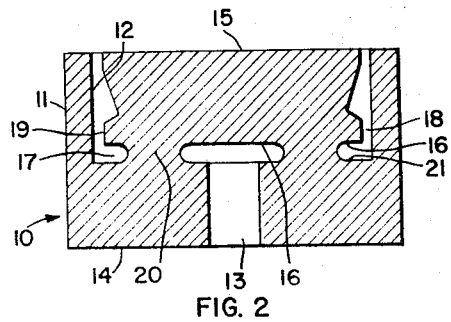
FIG. 7
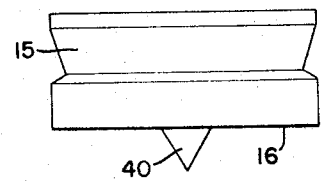
FIG. 1
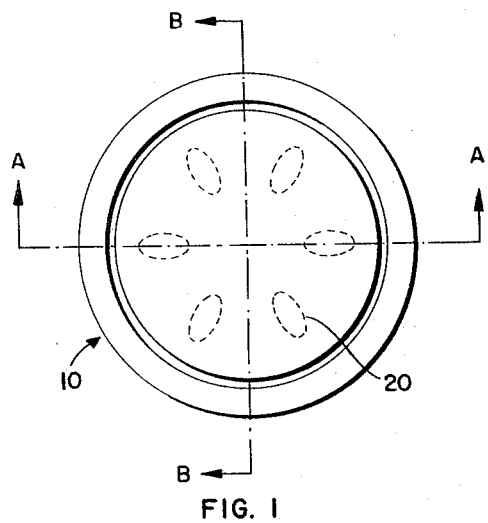
FIG. 4
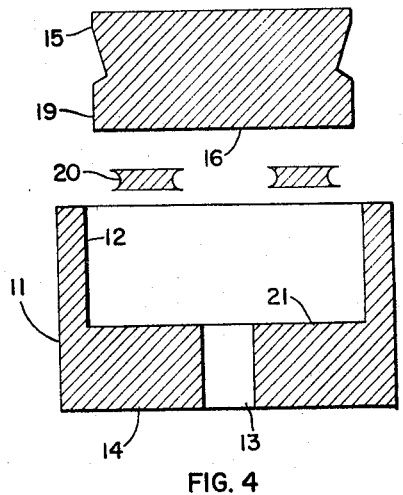

United States Patent Office 3,296,662
Patented Jan. 10, 1967

3,296,662
ANNULAR DIE
Garland E. Raley, Terre Haute, Ind., assignor to Ethyl Corporation, New York, N.Y., a corporation of Virginia
Filed Jan. 27, 1965, Ser. No. 428,409
11 Claims. (Cl. 18—14)

This invention relates to an improved annular die adapted for use in the manufacture of continuous seamless tubing of thermoplastic film, e.g., polyethylene, polypropylene, polyvinylchloride and the like.

An object of this invention is to provide an improved annular die suitable for the foregoing uses.

Another object is to provide a cylindrical die assembly having exceptional mechanical stability.

A further object is to provide a simple, durable and reliable annular die assembly capable of withstanding operating pressures as high as 10,000 p.s.i.

Still another object of this invention is to provide a die assembly capable of producing uniform seamless thermoplastic tubing in which weld lines are virtually non-existent or at least barely perceptible.

The above and other objects, advantages, features and characteristics will be apparent from the ensuing description and the accompanying drawings in which:

FIGURE 1 is a front elevation view of the die constituting the subject of this invention.

FIGURE 2 is a sectional view taken along line A—A of FIGURE 1 and depicts the die as an integral unit.

FIGURE 3 is an exploded sectional view along line A—A of FIGURE 1 and illustrates a preferred manner of fabricating the present die.

FIGURE 4 also represents an exploded sectional view taken along line A—A of FIGURE 1 and illustrates yet another preferred manner of fabricating the present die.

Figure 5:
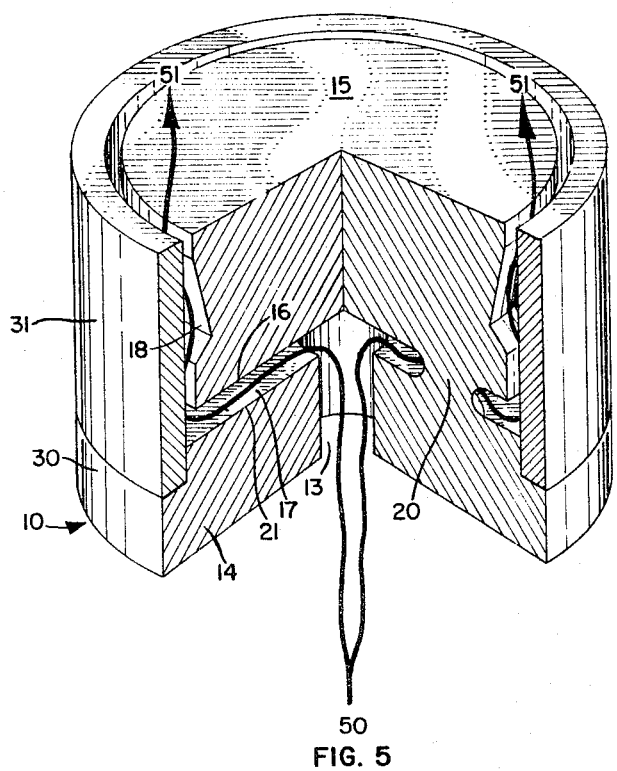

FIGURE 5 is a sectional isometric view taken along line A–B of FIGURE 1 and depicts the instant die composed of several components as illustrated in FIGURE 3.

Figure 6:
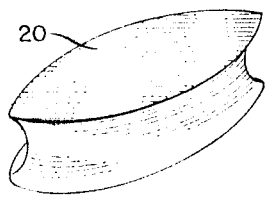

FIGURE 6 is an isolated view of the radially disposed spacer section or means positioned within the body of the die, e.g., as shown as a separate component in FIGURE 4.

FIGURE 7 is an isolated view of a mandrel equipped with a conical deflector to assist in radial distribution of the polymer flow.

As will be apparent even from a casual inspection of the drawings, the present invention comprises an annular die unit or assembly 10 generally indicated as composed of a cup or bowl-shaped section 11, e.g., shown as a separate component in FIGURE 4, having a cylindrical recess as determined by the diameter and depth of the inner peripheral surface 12 of the cup section 11. The die assembly 10 further comprises the inlet aperture 13 in the cup 11 which is centrally positioned within the circular faces 14 and 21 thereof and lies essentially along its longitudinal axis. A generally cylindrical mandrel or film forming means 15 is supported and disposed within the cylindrical recess of the cup 11 by means as described in particular hereinafter such that the circular face 16 of the mandrel 15 is in proximity to the aperture-containing circular face 21 of the cup 11 thereby forming the uniform horizontally disposed radial flow channel 17 which lies essentially in a plane perpendicular to the longitudinal axis of the die. The mandrel 15 has a diameter less than the diameter of the recess of cup 11 dictated by its interior surface 12 which in combination with the peripheral surface 19 of the mandrel 15 forms the flow channel 18. The annular flow channel 18 is disposed at an essentially constant diameter with respect to the longitudinal axis of the die. In other words, the flow channel 17 is essentially perpendicular to the flow channel 18. As shown in the drawings, the peripheral surface 19 of the mandrel 15 need not be flat and parallel to the surface 12, but rather can be V-shaped as shown, curved, or the like.

It can be appreciated from the above FIGURES 2, 3, and 4, that the instant die assembly can consist of a unitary structure or be fabricated from a number of components. For example, the structure embodied in FIGURE 2 can be realized by casting the entire die assembly or unit in a single step. On the other hand, the die can be fabricated as illustrated in FIGURE 3 from the member 30 which is composed of the inlet section and mandrel section 15 of the cup section 11 shown in FIGURE 2. In the embodiment of FIGURE 3, the outer portion or the side of the cup 11 of FIGURE 2 is provided in the form of a separate component, namely shroud 31 which is fastened to the unit 30 by suitable hardware. FIGURE 4 depicts even another manner in which the present die assembly can be fabricated. In that figure, the cup section 11 of FIGURE 2 is provided as a separate entity. The radially disposed attachment 20 (as shown isolated in FIGURE 6) and the mandrel or film forming means 15 also comprise separate components which are joined together by suitable hardware and which serve the same purposes as their corresponding sections in the single unitary structure of FIGURE 2.

In the preferred embodiments of this invention the mandrel or film forming section 15 is supported as described above by means of a plurality of spaced apart radially disposed attachment means or spacer sections 20 extending between the circular faces 16 and 21 of the mandrel 15 and cup 11 respectively. Although two such support members are entirely sufficient for certain types of operation, it is desirable that there be at least three such attachment means 20 extending between the circular faces 16 and 21, these attachment means being radially disposed at approximately equal intervals as depicted in FIGURE 1. The precise number of such attachment means 20, sometimes referred to as "spiders" will be dependent to some extent upon the diameter of the die in question. For example with dies ranging from about 8 inches or less up to about 18 inches in diameter, the use of four such spiders radially disposed at 90° intervals is particularly advantageous. On the other hand with larger dies, e.g., those having an annulus of from about 18 inches to about 30 inches in diameter, the provision of 6 spiders radially disposed at approximately 60° intervals as specifically shown in FIGURE 1 will be of particular advantage.

Another preferred embodiment of this invention involves the use of a plurality of the spiders 20 possessing an elliptical horizontal cross section whose longitudinal axis is generally parallel to the radii of the circular faces 16 and 21 of the mandrel 15 and cup 11 respectively. As illustrated in FIGURE 6 which is an isolated view of a spider 20, it is particularly desirable that they have relatively sharp leading and trailing edges. Further it is desirable that the outer surface of such spiders (including the leading and trailing edges) possesses a generally symmetrical concave configuration as this contributes materially to the elimination, or at least sharp reduction, of weld lines in the extruded continuous seamless tubing.

The flow pattern established in the present die by way of the above structure is illustrated in FIGURE 5 which represents a combination of the preferred embodiments depicted in FIGURE 1 (with regard to the elements 20) and FIGURE 3 (with regard to the separate shroud means 31). The fluid material 50 to be extruded is forced under pressure into the inlet aperture 13 and upon contact with the circular face 16 is thus forced radially outward into the uniform radial flow channel 17. Positioned within the channel 17 are the radially disposed attachment means or ellipsoidal sections 20 (which number 6 in this instance). The fluid material 50 under pressure continues its flow through the channel 17 past the means 20 into the annular outlet flow channel 18 established by a fixed predetermined spaced apart relationship of the peripheral surface 19 of the mandrel means 15 and the inner peripheral surface 12 of the shroud means 31. The extruded material 51 leaves the die 10 in the form of a tubular structure which has essentially no perceivable weld lines along its length.

It is to be noted that the flow is caused to make two consecutive 90° bends or turns as it proceeds from the inlet aperture 13 to the horizontal radial flow channel 17 and thence to the vertical annular flow channel 18. The utilization of this type of flow arrangement materially reduces the overall height of the die. Moreover, the optical properties of films, especially polyethylene films, produced with the present die are superior to the optical properties of films made on previously known conventional dies.

If desired mandrel 15 (whether fabricated as a separate unit as in FIGURE 4 or fabricated in combination with other units as in FIGURES 2 and 3) may be provided with a conical deflector 40 centrally positioned within its circular face 16, as is depicted in FIGURE 7. This deflector aids in radially distributing the flow into the uniform horizontal radial flow channel 17 as the flow impinges upon the conical surface of the deflector. Accordingly, deflector 40 may be of any suitable size so long as it does not block or materially restrict passage of the flow from aperture 13 into flow channel 17.

Needless to say, considerable departure can be made from the above structure without departing from the true spirit and scope of the instant invention. For example, the die assembly can be fabricated from components numbering more than that shown in the drawings. Moreover, the external configuration can be varied to considerable extent without defeating the basic purpose of this invention, for example while the instant die has been described in terms of being cylindrical (which is preferable), there is no reason why it cannot be shaped in the form of an ellipsoid (including the mandrel 15), as well as other shapes enabling the flow to take the two consecutive 90° turns referred to above. It is also to be understood that the instant die can be augmented with other equipment to increase its versatility, e.g., internal ducts for heating or cooling the die, adjusting means for varying the flow channels within the die, and the like.

What is claimed is:

1. An annular die assembly comprising a cup having a cylindrical recess and an aperture centrally positioned within its circular face, and a cylindrical mandrel having a diameter less than the diameter of the recess, the mandrel being supported and disposed within the recess such that a circular face of the mandrel is in proximity to the aperture-containing circular face of the cup thereby forming a uniform horizontally disposed radial flow channel leading to a vertically disposed annular flow channel about the peripheral surface of the mandrel.

2. An annular die assembly comprising a cup having a cylindrical recess and an aperture centrally positioned within its circular face, and a cylindrical mandrel having a diameter less than the diameter of the recess, the mandrel being supported and disposed within the recess such that a circular face of the mandrel is in proximity to the aperture-containing circular face of the cup thereby forming a uniform horizontally disposed radial flow channel leading to a vertically disposed annular flow channel about the peripheral surface of the mandrel, the mandrel being so supported by a plurality of spaced apart radially disposed attachment means extending between said circular faces.

3. An annular die assembly comprising a cup having a cylindrical recess and an aperture centrally positioned within its circular face, and a cylindrical mandrel having a diameter less than the diameter of the recess, the mandrel being supported and disposed within the recess such that a circular face of the mandrel is in proximity to the aperture-containing circular face of the cup thereby forming a uniform horizontally disposed radial flow channel leading to a vertically disposed annular flow channel about the peripheral surface of the mandrel, the mandrel being so supported by at least three spaced apart attachment means extending between said circular faces and radially disposed at approximately equal intervals.

4. An annular die assembly comprising a cup having a cylindrical recess and an aperture centrally positioned within its circular face, and a cylindrical mandrel having a diameter less than the diameter of the recess, the mandrel being supported and disposed within the recess such that a circular face of the mandrel is in proximity to the aperture-containing circular face of the cup thereby forming a uniform horizontally disposed radial flow channel leading to a vertically disposed annular flow channel about the peripheral surface of the mandrel, the mandrel being so supported by at least four spaced apart attachment means extending between said circular faces and radially disposed at approximately equal intervals, each of said means having an elliptical horizontal cross section whose longitudinal axis is generally parallel to the radius of said faces.

5. An annular die assembly comprising a cup having a cylindrical recess and an aperture centrally positioned within its circular face, and a cylindrical mandrel having a diameter less than the diameter of the recess, the mandrel being supported and disposed within the recess such that a circular face of the mandrel is in proximity to the aperture-containing circular face of the cup thereby forming a uniform horizontally disposed radial flow channel leading to a vertically disposed annular flow channel about the peripheral surface of the mandrel, the mandrel being so supported by at least four spaced apart attachment means extending between said circular faces and radially disposed at approximately equal intervals, each of said means being further characterized by having an elliptical horizontal cross section whose longitudinal axis is generally parallel to the radius of said faces, and by having a relatively sharp leading and trailing edge.

6. An annular die assembly comprising a cup having a cylindrical recess and an aperture centrally positioned within its circular face and a cylindrical mandrel having a diameter less than the diameter of the recess, the mandrel being supported and disposed within the recess such that a circular face of the mandrel is in proximity to the aperture-containing circular face of the cup thereby forming a uniform horizontally disposed radial flow channel leading to a vertically disposed annular flow channel about the peripheral surface of the mandrel, the mandrel being so supported by six spaced apart attachment means extending between said circular faces and radially disposed at approximately 60 degree intervals, each of said means being further characterized by having an elliptical horizontal cross section whose longitudinal axis is generally parallel to the radius of said faces, by having a relatively sharp vertical leading and trailing edge, and by having essentially vertical outer curvilinear surfaces.

7. An annular die assembly comprising a cup having a cylindrical recess and an aperture centrally positioned within its circular face and a cylindrical mandrel having a diameter less than the diameter of the recess, the mandrel being supported and disposed within the recess such that a circular face of the mandrel is in proximity to the aperture-containing circular face of the cup thereby forming a uniform horizontally disposed radial flow channel leading to a vertically disposed annular flow channel about the peripheral surface of the mandrel, the mandrel being so supported by six spaced apart attachment means extending between said circular faces and radially disposed at approximately 60 degree intervals, each of said means being further characterized by having an elliptical horizontal cross section whose longitudinal axis is generally parallel to the radius of said faces, by having a relatively sharp vertically concave leading and trailing edge, and by having vertically concave outer curvilinear surfaces.

8. An annular die assembly comprising a cup having a cylindrical recess and an aperture centrally positioned within its circular face, and a cylindrical mandrel having a diameter less than the diameter of the recess, the mandrel being supported and disposed within the recess such that a circular face of the mandrel is in proximity to the aperture-containing circular face of the cup thereby forming a uniform horizontally disposed radial flow channel leading to a vertically disposed annular flow channel about the peripheral surface of the mandrel, the mandrel being so supported by at least four spaced apart attachment means extending between said circular faces and radially disposed at approximately equal intervals, each of said means being further characterized by having an elliptical horizontal cross section whose longitudinal axis is generally parallel to the radius of said faces, by having a relatively sharp leading and trailing edge, and by having essentially vertically outer curvilinear surfaces.

9. An annular die assembly comprising a cup having a cylindrical recess and an aperture centrally positioned within its circular face, and a cylindrical mandrel having a diameter less than the diameter of the recess, the mandrel being supported and disposed within the recess such that a circular face of the mandrel is in proximity to the aperture-containing circular face of the cup thereby forming a uniform horizontally disposed radial flow channel leading to a vertically disposed annular flow channel about the peripheral surface of the mandrel, the mandrel being so supported by at least four spaced apart attachment means extending between said circular faces and radially disposed at approximately equal intervals, each of said means being further characterized by having an elliptical horizontal cross section whose longitudinal axis is generally parallel to the radius of said faces, by having a relatively sharp leading and trailing edge, and by having vertically concave outer curvilinear surfaces.

10. An annular die assembly comprising a cup having a cylindrical recess and an aperture centrally positioned within its circular face and a cylindrical mandrel having a diameter less than the diameter of the recess, the mandrel being supported and disposed within the recess such that a circular face of the mandrel is in proximity to the aperture-containing circular face of the cup thereby forming a uniform horizontally disposed radial flow channel leading to a vertical disposed annular flow channel about the peripheral surface of the mandrel, the mandrel being so supported by six spaced apart attachment means extending between said circular faces and radially disposed at approximately 60 degree intervals, each of said means having an elliptical horizontal cross section whose longitudinal axis is generally parallel to the radius of said faces.

11. An annular die assembly comprising a cup having a cylindrical recess and an aperture centrally positioned within its circular face and a cylindrical mandrel having a diameter less than the diameter of the recess, the mandrel being supported and disposed within the recess such that a circular face of the mandrel is in proximity to the aperture-containing circular face of the cup thereby forming a uniform horizontally disposed radial flow channel leading to a vertically disposed annular flow channel about the peripheral surface of the mandrel, the mandrel being so supported by six spaced apart attachment means extending between said circular faces and radially disposed at approximately 60 degree intervals, each of said means being further characterized by having an elliptical horizontal cross section whose longitudinal axis is generally parallel to the radius of said faces, and by having a relatively sharp leading and trailing edge.

References Cited by the Examiner

UNITED STATES PATENTS

| 3,075,242 | 1/1963 | Grafried | 18—14 X |
| 3,090,995 | 5/1963 | Amsden | 18—14 |
| 3,225,386 | 12/1965 | Newman | 18—12 X |

FOREIGN PATENTS

| 1,361,159 | 4/1964 | France. |
| 1,013,865 | 8/1957 | Germany. |

WILLIAM J. STEPHENSON, Primary Examiner.